March 30, 1971  D. A. BENNETT  3,573,246
PROCESS OF MODIFYING SYNTHETIC RUBBER LATICES
Filed March 6, 1968  4 Sheets-Sheet 1

INVENTOR
DONALD ALFRED BENNETT
BY
Kenyon & Kenyon
ATTORNEYS

INVENTOR
DONALD ALFRED BENNETT

March 30, 1971  D. A. BENNETT  3,573,246
PROCESS OF MODIFYING SYNTHETIC RUBBER LATICES
Filed March 6, 1968  4 Sheets-Sheet 3

INVENTOR
DONALD ALFRED BENNETT
BY
Kenyon & Kenyon
ATTORNEYS

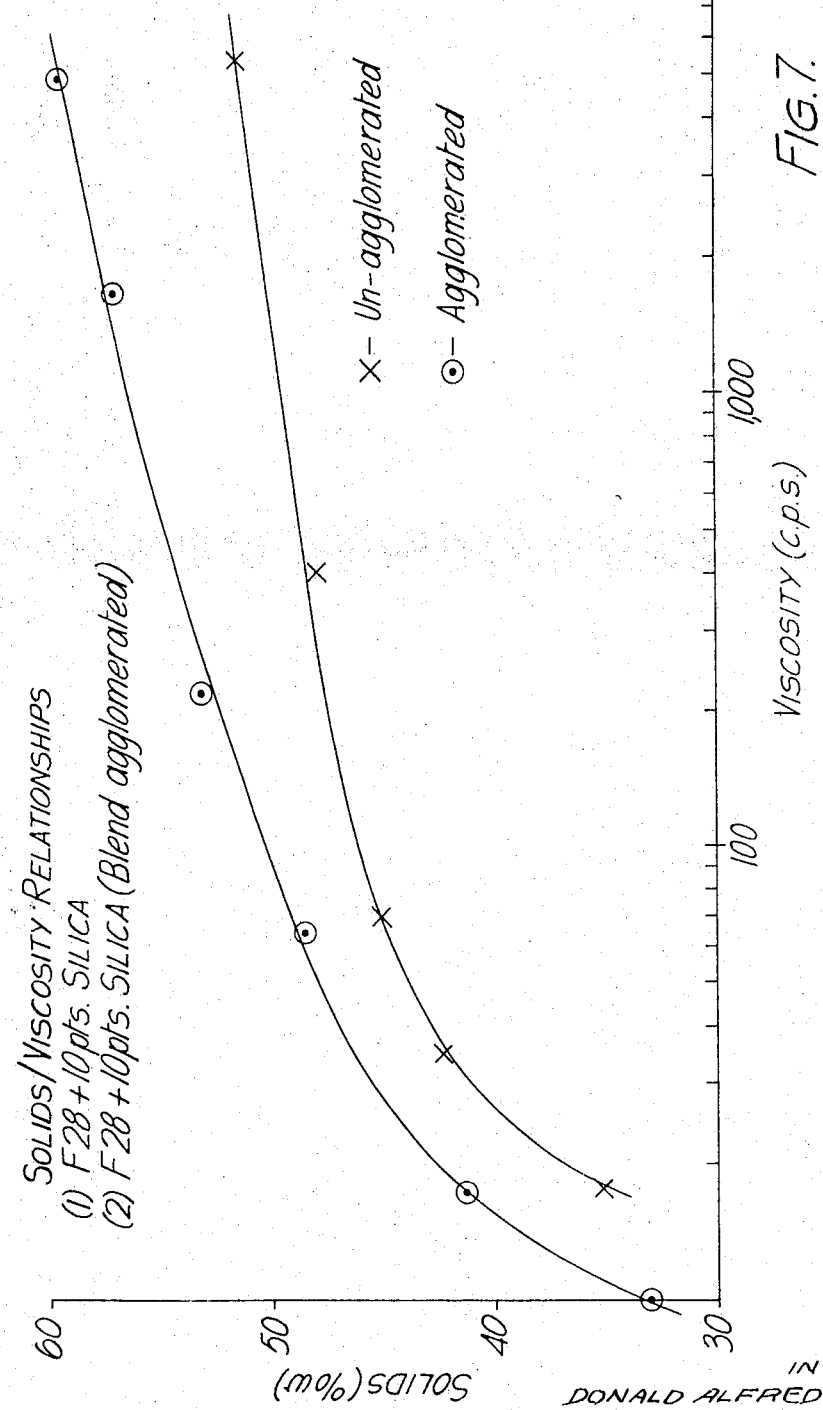

3,573,246
PROCESS OF MODIFYING SYNTHETIC
RUBBER LATICES
Donald Alfred Bennett, Beaulieu, England, assignor to The International Synthetic Rubber Company Limited, Southampton, England
Continuation-in-part of application Ser. No. 169,169, Jan. 23, 1962. This application Mar. 6, 1968, Ser. No. 710,981
Int. Cl. C08j 9/08, 5/00
U.S. Cl. 260—29.7
6 Claims

ABSTRACT OF THE DISCLOSURE

This invention relates to a process of increasing the particle size and modifying the particle size distribution of synthetic rubber latex in the presence of reinforcing agent such that an improved solids/viscosity relationship is obtained and the physical properties of rubber compounds prepared from the latex are improved. The process comprises flowing a mixture of synthetic rubber latex and finely divided reinforcing agent, under pressure through a constriction, the pressure drop across the constriction being not less than about 1000 p.s.i.g. The mixture has a total solids content not less than about 25% by weight and contains from about 15 to 50 parts by weight of reinforcing agent per 100 parts of rubber.

---

This application is a continuation-in-part of my application Ser. No. 169,169, filed Jan. 23, 1962 for Natural and Synthetic Rubber Latices, and now abandoned.

This invention relates to a process of increasing the particle size and modifying the particle size, distribution of synthetic rubber latex in the presence of reinforcing agent such that an improved solids/viscosity relationship is obtained and the physical properties of rubber compounds prepared from the latex are improved.

It is an object of the invention to increase the average size of the dispersed rubber particles in the latex and to cause the particles of reinforcing agent and the rubber particles to adhere together.

Another object of the invention is to process a synthetic rubber latex with a reinforcing agent comprising polystyrene or a copolymer of a minor proportion of butadiene and a major proportion of styrene, or an inorganic reinforcing agent such as silica to obtain a latex of reinforced rubber, with improved solids/viscosity relationship.

According to the present invention a method of treating a synthetic rubber latex to increase the average particle size of the synthetic rubber in the latex in the presence of a reinforcing agent includes flowing a mixture of synthetic rubber latex and finely divided reinforcing agent, under pressure through a constriction, the pressure drop across said construction being not less than about 1000 p.s.i.g., said mixture having a total solids content not less than about 25% by weight and containing from about 15 to 50 parts by weight of reinforcing agent per 100 parts of rubber.

It is known to use homogenising equipment in other processes, for example the treatment of milk, in which the effect is to reduce the size of suspended particles to produce a more uniform dispersion. We have discovered however that with a mixture of synthetic rubber latex and an aqueous dipsersion of reinforcing agent, the opposite effect takes place in that there is an increase in the average size of the particles of the synthetic rubber, when the mixture is passed through homogenising equipment. Furthermore, the particles of synthetic rubber are forced into intimate contact with the particles of the reinforcing agent with the result that they adhere together. This compounding, in a liquid phase, between the rubber particles and the particles of the reinforcing agent enables end products to be prepared having improved physical properties compared with the properties of end products prepared from mixed latices which have not been treated in homogenising equipment in accordance with the present invention.

An advantage of the present invention is the increase in average particle size of the synthetic rubber. If a synthetic rubber latex consisting of rubber particles in the size range of 300–1000 angstrom units is concentrated, its viscosity increases very rapidly at about 40% total solids content, so that concentration much beyond this stage cannot be carried out in conventional equipment, i.e. by evaporation. If the average size of the rubber particles is increased, then concentration may be carried out appreciably beyond 40% total solids content before the latex viscosity prevents further concentration. It will therefore be appreciated that by raising the average size of the rubber particles, in accordance with the present invention, the compounded mixture of rubber and reinforcing agent, in the aqueous phase may, by evaporation, be taken to a higher solids content than otherwise would be possible without the viscosity becoming unacceptably high.

An example of the use of reinforcing synthetic rubber latices to prepared products with improved physical properties is the addition of polystyrene latex or a latex containing a polymer of butadiene and styrene, in which styrene is present in greater proportions than butadiene, to a latex containing butadiene styrene copolymer of lower styrene content. Thus in the preparation of so-called "latex foam goods," using conventional latex foam processes, from mixtures of synthetic rubber latex and aqueous dispersion of polystyrene or a cooplymer of a minor proportion of butadiene and a major proportion of styrene the physical properties of such goods are superior if the said mixture is treated in accordance with the present invention prior to preparation of the latex foam article. One example of improvement in physical properties is the improved hardness or resistance to compression of a cushion made from latex foam. If the mixture is treated in accordance with the present invention, then the resistance to compression is increased and the cushion may be cheapened by the adddition of inexpensive diluents, e.g. oil, or by foaming the latex mixture to a lower density. Thus less latex is required to be used to produce a cushion of given dimensions having a given resistance to compression, compared with an identical cushion prepared from a conventional latex mixture.

The reinforced latex product resulting from the process of the present invention may be coagulated, washed and dried in conventional manner. The resulting dry product has superior physical properties when suitably vulcanised compared with the properties of a product prepared by coagulating, washing and drying a mere mixture of reinforcing agent and latex, which has not been passed through homogenising equipment.

To obtain satisfactory results in the performance of the present invention attention must be paid to pressure, pH, initial solids content and temperature. The pressure drop to which the mixture is subjected on passing through the constriction of a homogenising valve preferably is of the order of about 4000–5500 p.s.i.g. and should not be less than about 1000 p.s.i.g. The pressure drop may be as high as 10,000 p.s.i.g. and it is to be noted that there is no absolute maximum pressure, this in practice is set by the capacity of the particular homogeniser being used.

The pH of the rubber/reinforcing agent mixture, when it is subjected to treatment in the homogeniser, should be in the range of 8–12, preferably 8.2–9.5. If the pH is too low, that is to say below about 8, then the mixture will be unstable during and after treatment.

The total solids content (i.e. rubber and reinforcing agent) in the mixture should not be less than about 25% by weight since if at the time of treatment the solids content is appreciably less than 25%, for example only 15%, then there will be no adhesion of rubber to reinforcing agent and little or no increase in average particle size of the rubber. Maximum solids content of the mixture which can be tolerated is in the region of about 50% in the case of styrene/butadiene rubber latex/polystyrene mixture. At a higher solids content the viscosity of the mixture is found to be too high to allow the mixture to be forced through the homogenising valve.

The temperature of the rubber/reinforcing agent mixture, whilst important, is not critical and preferably should not exceed 110° F. The temperature can be as low as 32° F., but no advantages are to be obtained in working at temperatures lower than 55° F.

A synthetic rubber latex conventionally is stabilised by soap and in the practice of the present invention there should be about a 35% coverage of the rubber particles by soap. It will be appreciated that this is conventional and corresponds to a soap to rubber ratio of 5.0:100 with rubber particles of 600-700 angstrom units average size, and 8.5:100 with rubber particles of 500-600 angstrom units average size. The soap to rubber ratio of a synthetic rubber latex is related to the particular polymerisation process used to prepare the latex. As the soap content increases, it is necessary to decrease the pH to achieve similar agglomeration or alternatively operate at a higher solids content or at a higher pressure. Adjustment to pH of the latex controls the active soap content and therefore any surplus soap is converted to acid and rendered inert.

The reinforcing agent, as mentioned before, may be a homopolymer of styrene or a copolymer of a minor proportion of butadiene and a major proportion of styrene and conventional aqueous suspensions of such polymers are also stabilised by soap. In the practice of the present invention it is not necessary for the soaps stabilising the rubber latex and the suspension of reinforcing agent, when this is a polymer, to be identical but they should be compatible. When the reinforcing agent is silica or other inorganic material, this point of soap compatibility does not arise.

Up to 50 parts by weight of reinforcing agent to 100 parts of rubber can be tolerated and preferably the amount of reinforcing agent is in the range of 15-30 parts to 100 parts of rubber. If the amount of reinforcing agent substantially exceeds 50 parts per 100 parts of rubber then there is a risk of rendering unstable the rubber/reinforcing agent mixture, after treatment.

In further explanation of the present invention reference is now made to the accompanying drawings, in which FIG. 1 is a graph showing solids content/viscosity relationship;

FIG. 7 is a graph showing solids content/viscosity relationship, with silica as the reinforcing agent.

In the following description the expression "agglomerated latex" refers to a rubber/reinforcing agent blend treated in accordance with the present invention and the expression "unagglomerated latex" refers to a simple mixture or blend of rubber latex and reinforcing agent, prepared by conventional techniques.

Figures 1, 2:
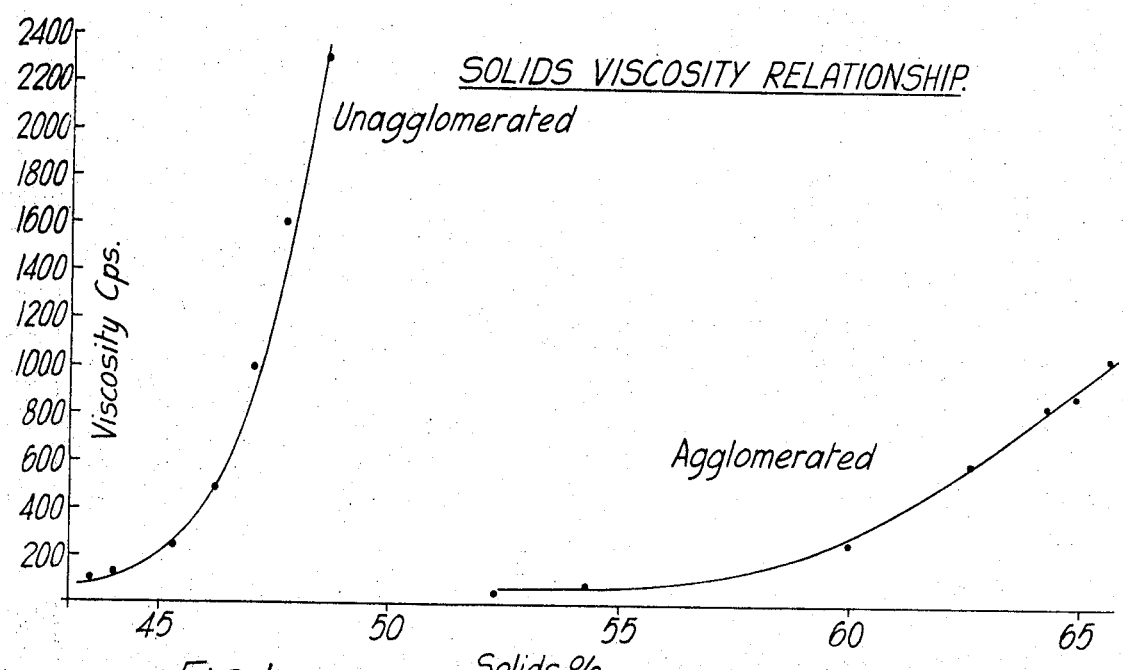
FIG. 2 is a graph relating soap coverage to surface tension.

The graph of FIG. 1, solids content/viscosity relationship, shows that at a given viscosity, the solids content of an agglomerated latex is much higher than the solids content of an unagglomerated latex. The two latices examined to produce the graph were prepared by mixing a latex of a styrene-butadiene copolymer (Intex F28 Latex) with a polystyrene latex (40% solids content and particle size 1100 angstrom) there being 17.5 parts by weight of polystyrene to 100 parts of styrene-butadiene copolymer (rubber). The latex mixture was concentrated, by evaporation, to a solids content of 36.3%. The mixture was divided into two portions, one portion forming the unagglomerated latex and the other portion being passed, in accordance with the present invention, through a homogeniser at a pressure of 4500 p.s.i.g., temperature to 75° F. and pH of 8.5, to give the agglomerated latex.

The "surface tension/soap coverage" graph, FIG. 2, is used to indicate the degree of agglomeration. As agglomeration proceeds the total surface area of the particles decreases whilst the soap to rubber ratio remains constant. A stage is reached when the total rubber particle surface area is reduced to a value which is just sufficient for the soap present to cover it completely (100% soap coverage). Further agglomeration produces further reduction in total rubber particles surface area with a consequent reduction in soap requirement for 100% soap coverage. The free soap released causes a sudden change in the rate of reduction in the surface tension of the aqueous phase. Thus by following the change in surface tension throughout agglomeration the point at which 100% soap coverage occurs, can be determined.

In plotting the graph of FIG. 2 a latex mixture of styrene-butadiene copolymer (Intex F28) and polystyrene (40% solids content and particle size 1100 angstrom) 17.5 parts by weight of polystyrene to 100 parts of copolymer (rubber), was treated in a homogeniser at different pressures to obtain different degrees of agglomeration, other variables being kept constant, namely:

pH—8.5
Temperature—75° F.
Solids content—36.3%

Figure 3:
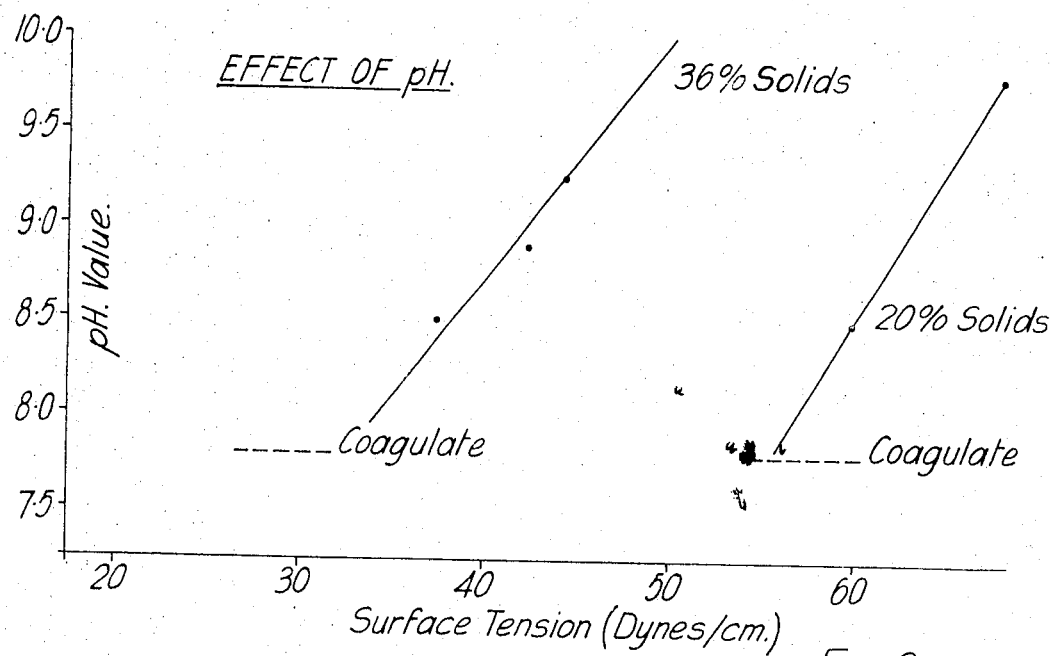
FIG. 3 is a graph showing the effect of pH.

The "effect of pH" graph, FIG. 3, shows that the degree of agglomeration, as indicated by surface tension, increases at a given solids content as the pH of the feed latex is decreased. It also shows that at a given pH the degree of agglomeration increases as the solids content of the feed latex increases. The latex used in preparing this graph was styrene-butadiene copolymer (Intex F28) with 17.5 parts (per 100 parts rubber) polystyrene. The homogeniser treatment was performed at 4500 p.s.i.g. at 80° F.

Figure 4:
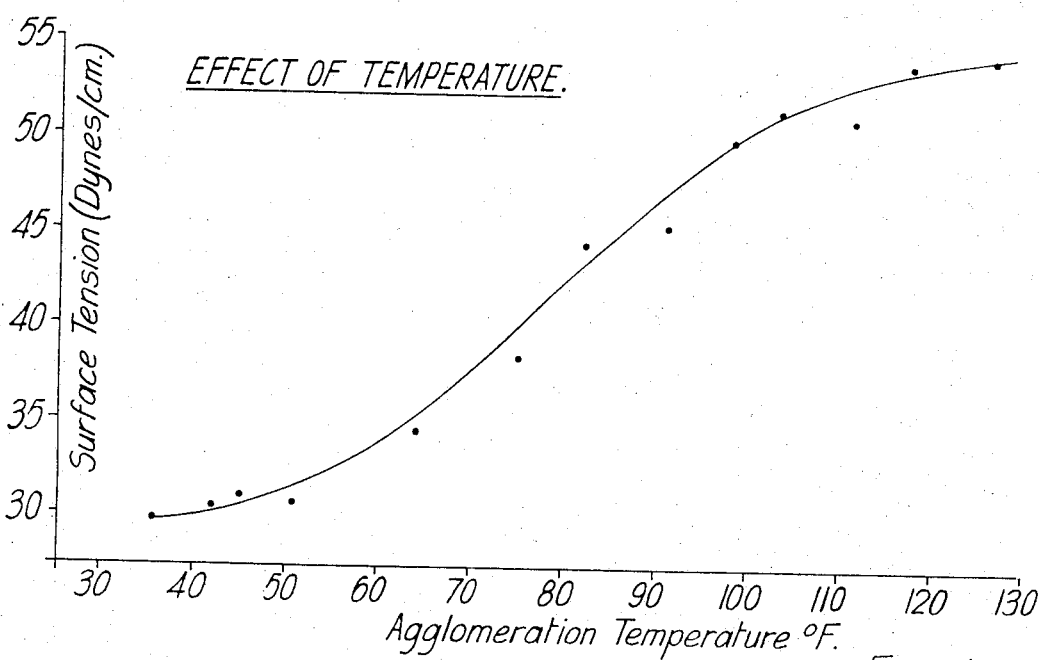
FIG. 4 is a graph showing the effect of temperature.

The "effect of temperature" graph, FIG. 4, shows that the degree of agglomeration, as indicated by surface tension, is increased as the temperature of the feed latex is decreased. The feed latex again was styrene-butadiene copolymer (Intex F28) with 17.5 parts (per 100 parts rubber) polystyrene. The feed latex had a solids content of 35% and a pH of 8.9. Homogeniser treatment was at a pressure of 4000 p.s.i.g.

Figure 5:
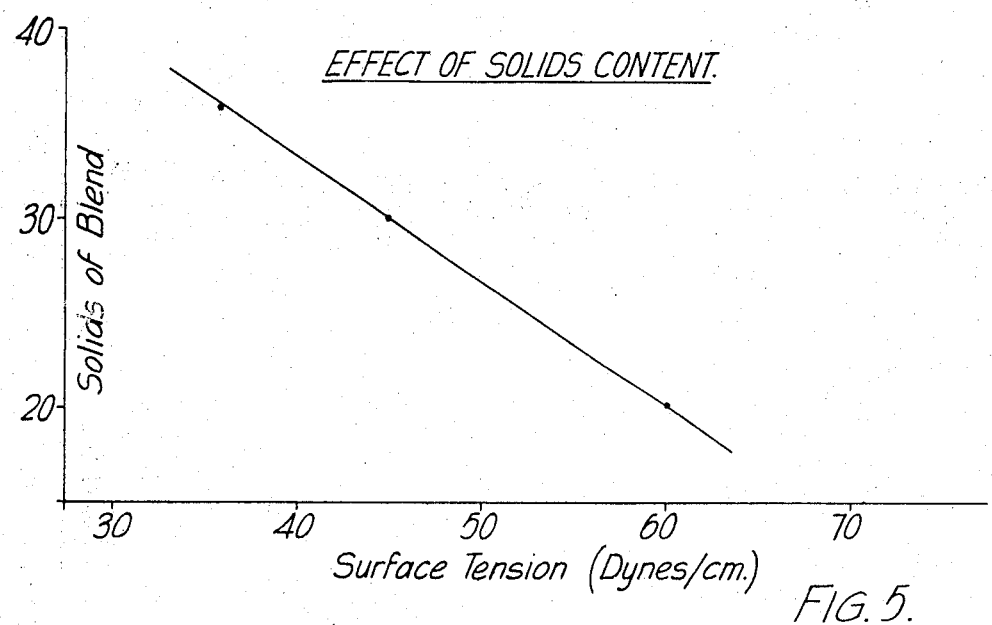
FIG. 5 is a graph showing the effect of solids content.

The "effect of solids content" graph, FIG. 5, shows that the degree of agglomeration, as indicated by surface tension, is increased as the solids content of the feed latex is increased. The feed latex, styrene-butadiene copolymer (Intex F28) with 17.5 parts (per 100 parts rubber) polystyrene was subjected to homogeniser treatment at a pressure of 4500 p.s.i.g., a temperature of 79° F. and a pH of 8.5.

Figure 6:
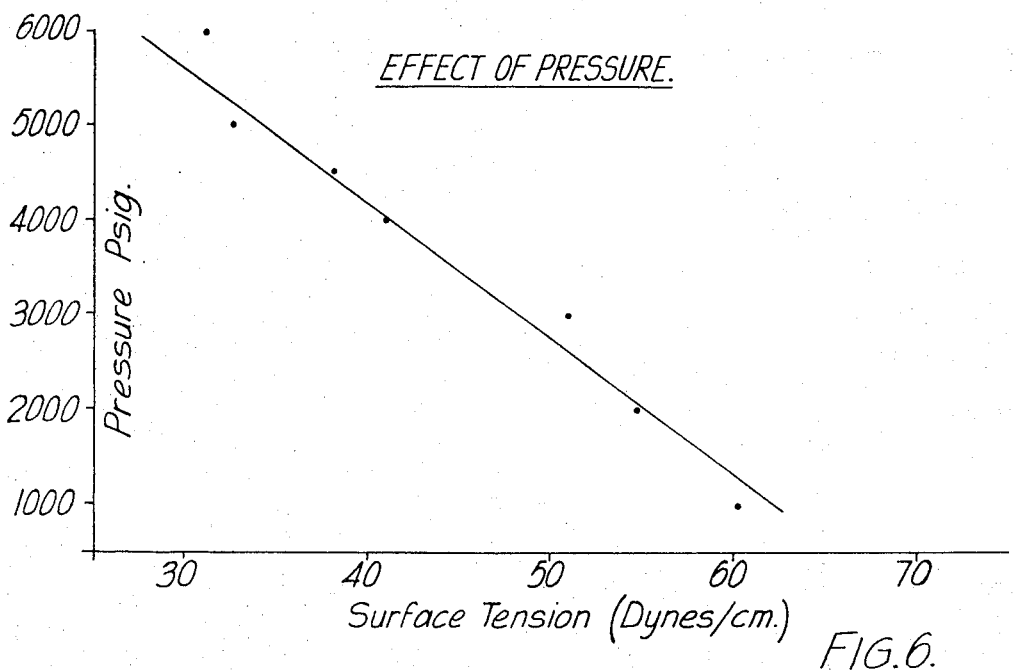
FIG. 6 is a graph showing the effect of pressure.

The "effect of pressure" graph, FIG. 6, shows that the degree of agglomeration, as indicated by surface tension, is increased as the pressure drop is increased. The feed latex again was styrene-butadiene copolymer (Intex F28) with 17.5 parts (per 100 parts rubber) polystyrene and had a solids content of 36.3% and pH of 8.5. Homogeniser treatment was performed at a temperature of 78° F.

A second graph of solids content/viscosity relationship is shown in FIG. 7 but in this case the reinforcing agent was silica, instead of polystyrene (FIG. 1). In plotting the graph of FIG. 7, latices were prepared in the manner described with reference to FIG. 1 but containing 10 parts by weight of finely divided silica per 100 parts of copolymer (rubber). The agglomerated portion was obtained by homogeniser treatment at a pressure of 6000 p.s.i.g., a temperature of 60° F. and pH 8.5. The initial solids content was 33%.

In the foregoing figures the degree of agglomeration has been determined by measuring surface tension. As surface tension decreases it is to be understood that the degree of agglomeration increases and an improved solids content/viscosity relationship is obtained. For instance, referring to FIG. 1, the surface tension of the unagglomerated latex was approximately 60 dynes whereas that of the agglomerated latex was approximately 35 dynes.

The practice of the present invention is demonstrated by the following examples and the homogeniser used in the performance of these examples was a model No. 4PV Type 15M/8BA manufactured by Manton Gaulin Manufacturing Co. Inc. of Everett, Mass., U.S.A.

EXAMPLE 1

Intex F28 Latex (Intex is a registered trademark), a styrene-butadiene copolymer latex of approximately 28% total solids content, containing about 24% styrene and prepared in emulsion at 42–55° F. using potassium oleate emulsifier, a conventional redox polymerization initiator and a dithiocarbamate shortstop, was concentrated in a laboratory evaporator to approximately 40% total solids content. Concentration much beyond this point was not practical due to the high viscosity of the latex. The concentrated latex was divided into two portions.

One portion was passed through the homogeniser at a pressure of 5000 p.s.i.g. and ambient temperature, the pH of the latex having been previously adjusted to 10.0 by the addition of sodium silicofluoride. To 100 parts of this latex (parts dry weight) was added 20 parts (dry weight) of a polystyrene latex of 48% total solids content. The polystyrene latex is known commercially as Lustrex 45A and is manufactured by Monsanto Chemicals Limited. The mixed latices were concentrated in a laboratory evaporator to a final total solids content of 65% at which point the viscosity was 170 centipoise (cps.).

This procedure was repeated with the second portion except that the polystyrene latex was added to the S.B.R. latex before the homogeniser treatment. Thus, in this case the agglomeration effect took place in the presence of the reinforcing agent (polystyrene) in accordance with the process of the invention.

Each of these two samples was compounded to the following formulation in which parts are parts by dry weight:

| | Parts |
|---|---|
| Styrene/butadiene latex plus Polystyrene latex | 120 |
| Nonox W.S.L.[1] | 1.0 |
| Sulphur | 2.0 |
| Mercaptobenzothiazole | 1.5 |
| Robac Gamma[2] | 1.5 |

[1] Nonox W.S.L. is an antioxidant manufactured by Imperial Chemical Industries Limited.
[2] Robac Gamma is a mixture of dithiocarbamates manufactured by Robinson Bros. Ltd. of West Bromwich, England.

Each compounded latex was allowed to stand overnight.

Three parts of zinc oxide and 1.5 parts of sodium silicofluoride were then added to each. Gelation time at room temperature was 3½ minutes, but before gelation took place, the compounded latices were spread evenly on glass plates to give dried films of approximately 0.05 inch thickness. After gelation, the films were lifted from the plates and then placed freely to allow unrestricted shrinkage to take place. The films were dried for 60 minutes in a forced air oven at 95° C. and a final vulcanization time of 30 minutes at 120° C. was allowed. The vulcanized films were cooled in a dessicator, test pieces cut from all films and the stress strain values determined using a rubber testing tensometer. The results are given below:

| | Gelled film before curing, elongation at break, percent | Cured film | | |
|---|---|---|---|---|
| | | 100% modulus, p.s.i. | Tensile strength, p.s.i. | Elongation at break, percent |
| Polystyrene latex added after homogeniser treatment | 70 | 149 | 160 | 105 |
| Polystyrene latex added before homogeniser treatment | 150 | 145 | 200 | 180 |

The greatly improved elongation at break of the gelled film before curing and the improved tensile strength of the cured film, indicates that, by carrying out the homogeniser treatment in the presence of the reinforcing polystyrene latex, the degree of reinforcement conferred on the S.B.R. latex is increased.

One of the major uses for latex is in the manufacture of latex foam. Portions of the two latices were therefore used to prepare latex foam test pieces.

Each latex sample was compounded according to the following formulation (parts are by dry weight):

| | Parts |
|---|---|
| Styrene/butadiene copolymer plus polystyrene latex solids (total solids content) | 120 |
| Potassium oleate (10% aqueous solution) | 1.5 |
| Nonox W.S.L. (15% emulsion in water) | 1.0 |
| Sulphur (50% aqueous dispersion) | 2.5 |
| Mercaptobenzothiazole (33⅓% aqueous dispersion) | 1.5 |
| Robac Gamma (33⅓% aqueous dispersion) | 1.5 |

Each compounded latex was mixed in a planetary mixer until the volume of foamed latex produced was 750% of the original compounded latex volume.

To each latex foam was added whilst still in the planetary mixer the following:

| | Parts |
|---|---|
| Vulcafor EFA (a foam sensitiser manufactured by I.C.I. Ltd.) | 0.5 |
| Zinc oxide (50% aqueous dispersion) | 3.0 |
| Ammonium acetate (10%) aqueous solution) | 0.75 |
| Sodium silicofluoride (50%) aqueous dipersion) | 2.5 |

Each latex foam was then poured into aluminium moulds which had been heated to approximately 40° C. Each foam gelled in approximately 3½ minutes and soap break down was complete in approximately 10 minutes.

The moulded foam samples were cured in steam at atmospheric pressure for 60 minutes followed by drying and completion of curing at 205° F. for 120 minutes. Sample pads were tested and found to have the following properties:

| | Polystyrene added after homogeniser treatment | Polystyrene added before homogeniser treatment |
|---|---|---|
| Compression set (percent of compression) | 16 | 4 |
| Elongation at break (percent) | 73 | 176 |
| Foam density, gms./cc. | 0.095 | 0.091 |
| Compression modulus, gms./cm.² at 50% compression | 83.0 | 48.2 |
| Corrected compression modulus, gms./cm.² at 50% compression | 40.4 | 59 |

The correction of compression modulus for elongation at break is justified for the following reasons:

In "Rubber latex foam" manufacture it is necessary to achieve an elongation at break of at least 150% otherwise when removing finished cured articles, e.g. cushions, from the moulds the articles will tear due to the stretching involved in pulling them from the moulds. Also the finished articles tear and break up due to the stresses applied during normal service.

In the case of the styrene/butadiene polystyrene blend prepared without homogeniser treatment the elongation at break is considerably below the minimum level of 150% and a softener, e.g. oil has to be added to raise the elongation at break to this minimum level.

The addition of such softener reduces the compression modulus, e.g. in this case from 83 to 40.4 gms./cm.$^2$.

In the case of styrene/butadiene polystyrene mixture prepared with homogeniser treatment the elongation at break is already above the minimum value and reducing it to the minimum level increases the compression modulus from 48.2 to 59 gms./cm.$^2$.

It is seen that the effect of carrying out the homogeniser treatment to produce agglomeration in the presence of reinforcing (polystyrene) latex particles enable "latex foam" articles having superior compression set, elongation at break and conpression modulus properties to be obtained.

EXAMPLE 2

A sample of the F28 latex used in Example 1 was evaporated to 47% solids and 15 parts (dry weight) of polystyrene as a 40% latex with a particle size of 1100 A. were mixed in. The viscosity of the mixture was 1000 cps.

A portion of the mixed latices was agglomerated at a pressure of 4500 p.s.i. a pH of 8.5 and a temperature of 80° F. to give a high solids latex of 800 cps. viscosity at 65% solids after further evaporation. The unagglomerated and agglomerated latices were compounded to the following formulation in which parts are parts by dry weight:

| | Parts |
|---|---|
| Latex | 100 |
| Potassium oleate | 0.5 |
| Sulphur | 2.2 |
| Zinc diethyl dithiocarbamate | 0.75 |
| Zinc mercaptobenzthiasole | 0.75 |
| Antioxidant | 1.0 |
| Zinc oxide | 3.0 |
| Diphenylguanidine | 0.5 |
| Sodium silicofluoride | 4.0 |

The physical properties of test foams prepared by the Dunlop process were measured and were as follows:

| | S.B.R./ polystyrene blended | S.B.R./ polystyrene agglomerated |
|---|---|---|
| Density, gms./cc | 0.10 | 0.10 |
| Tensile strength, lbs./in.$^2$ | 5.0 | 8.5 |
| Tensile strength, lbs./cm.$^2$ | 0.35 | 0.60 |
| Elongation at break | 130 | 165 |
| Compression modulus at 50% compression, gms./cm.$^2$ | 100 | 95 |
| Compression set percent (50% compression for 22 hrs. at 70° C.) | 22.5 | 20.5 |

Thus using the process of the invention a reinforced latex of high solids content at workable viscosity was obtainable. Further, the physical properties of the reniforced latex obtained by the process were superior to those obtained from the latex simply blended with the reinforcing agent.

EXAMPLE 3

Three reinforced latices were prepared as in Example 2 using 5, 10 and 15 parts of the polystyrene under the agglomeration conditions given below.

| | pH | Solids, percent | Pressure, p.s.i. |
|---|---|---|---|
| (a) 5 parts P/S | 8.8 | 36 | 4,500 |
| (b) 10 parts P/S | 8.75 | 35 | 4,500 |
| (c) 15 parts P/S | 8.65 | 34.5 | 4,500 |

In all cases the amount of coagulum was negligible (<.02%). The reinforced latices weer compounded to the following formulation in which parts are parts by dry weight.

| | Parts |
|---|---|
| SBR+polystyrene latex | 80 |
| Natural rubber latex | 20 |
| Felspar | 40 |
| Potassium oleate | 1.5 |
| Sulphur | 2.2 |
| Zinc diethyldithiocarbamate | 1.25 |
| Zinc mercaptobenzthiazole | 1.25 |
| Nonox W.S.L. | 1.0 |
| Zinc oxide | 3.0 |
| Vulcafor E.F.A. | 0.7 |
| Ammonia | 0.6 |

Sample foams prepared by the Talalay process were tested and the following physical properties observed.

| Parts of polystyrene | 5 | 10 | 15 |
|---|---|---|---|
| Foam density (gm./cc.) | 0.104 | 0.104 | 0.104 |
| Tensile strength (p.s.i.) | 8.75 | 9.4 | 9.4 |
| Elongation at break, percent | 200 | 189 | 160 |
| Compression modulus at 50% compression (gms./cm.$^2$) | 66 | 69 | 79 |

This example shows that with varying amounts of polystyrene reinforcing agent, foams with good all round physical properties ideally suited to use in latex foam products are obtained.

EXAMPLE 4

A styrene-acrylonitrile copolymer latex of 40% solids concentration containing 33% acrylonitrile was evaporated to 55% solids and mixed with 10 p.h.r. of the polystyrene used in Example 2. The viscosity was 1,200 cps. After agglomeration at 65° F. at a pH of 7.8 and a pressure of 6,500 p.s.i., a reinforced nitrile latex of 61% solids with a viscosity of 1,000 cps., was obtained.

EXAMPLE 5

Two silica reinforced latices were prepared from the F28 latex described in Example 1 which had been evaporated to 33% solids. In the one case 10 p.h.r. of silica was mixed with the latex prior to homogeniser treatment of 60° F., at a pH of 8.3 and a pressure of 6000 p.s.i. The solids/viscosity relationship before and after agglomeration is shown in the graph.

In the second case, the 10 p.h.r. of silica was mixed with the latex after the latex alone had been passed through the homogeniser under the same conditions.

Sample foams prepared using the formulation and foaming process described in Example 3 (Talalay) were tested and the following physical properties observed:

| | Silica added before homogeniser treatment | Silica added after homogeniser treatment |
|---|---|---|
| Density gms./cc | 0.093 | 0.083 |
| Tensile strength, p.s.i. | 7.2 | 8.0 |
| Elongation, percent | 13.0 | 13.0 |
| K factor* at 25% compression | 12.4 | 14.1 |
| K factor* at 40% compression | 17.5 | 18.3 |

*The K factor gives a comparison of the load bearing properties of foams of different densities. The compression modulus value of latex foam is the accepted standard for comparing load bearing characteristics. However this property depends on density. To compare foams of different density, it is common practice to quote K factors in the case of 25% and 40% compression the relationship $$K = \frac{\text{Compression modulus}}{\text{Density}^{2.5}}$$

is used.

EXAMPLE 6

A sample of a mixture of butadiene-styrene rubber latex and polystyrene reinforcing agent emulsion was subjected to a homogenizer treatment in accordance with the present invention. A photomicrograph of a specimen of an untreated sample of the same mixture was taken after hardening of the rubber by bromination. A similar photomicrograph was taken of the treated sample, also after bromination. The microphotograph of the untreated sample showed discrete particles of rubber and reinforcing agent, whereas the microphotograph of the treated sample showed increased particle size from agglomeration of rubber particles and reinforcing agent. The larger particles comprised about 90% by weight of the total weight of all particles.

Another photomicrograph was taken of the treated latex using a known shadowing technique, but without bromination. This technique involves causing the soft rubber particles to collapse whilst the rigid polystyrene particles remain standing out, and this effect was clearly visible in the photomicrograph in which polystyrene particles were seen to be surrounded by or joined to the rubber particles.

What is claimed is:

1. A method of treating a synthetic rubber latex to increase the average particle size of the synthetic rubber in the latex in the presence of a reinforcing agent, comprising flowing a mixture of synthetic rubber latex and finely divided reinforcing agent, selected from the group consisting of polystyrene, a copolymer of butadiene and styrene in which styrene is present in a greater proportion than butadiene and silica, under pressure through a constriction, the pressure drop across said constriction being not less than about 1000 p.s.i.g., said mixture having a total solids content not less than about 25% by weight and containing from about 15 to 50 parts by weight of reinforcing agent per 100 parts of rubber.

2. A method according to claim 1 wherein the pH of the mixture of rubber latex and reinforcing agent, to be treated is in the range between about 8 to 12.

3. A method according to claim 1 wherein the mixture of rubber latex and reinforcing agent is passed through the constriction at a temperature in the range 32° F. to 110° F.

4. A method of modifying an aqueous dispersion of synthetic rubber and finely divided reinforcing agent selected from the group consisting of polystyrene, a copolymer of butadiene and styrene in which styrene is present in a greater proportion than butadiene and silica, comprising flowing the dispersion through a homogenising valve at a pressure of between about 1000 p.s.i.g. and 10,000 p.s.i.g., said dispersion having a total solids content of not less than about 25% by weight and being maintained at a temperature in the range of between about 50° F. and 110° F. and at a pH between about 8 and 12, so as to form a stable dispersion having enlarged particles of rubber to which are joined particles of reinforcing agent.

5. A method of treating an aqueous dispersion of synthetic rubber and reinforcing agent therefor in finely divided form comprising flowing said dispersion through a homogenising valve at a pressure not less than about 1000 p.s.i.g., said dispersion being at a temperature in the range about 55° F. to 90° F., having a pH in the range about 8.2 to 9.5 and a total solids content in the range 25% to 50% by weight and containing from about 15 to about 30 parts by weight of reinforcing agent per 100 parts of rubber, whereby in the modified dispersion substantially all the particles of reinforcing agent are bonded to particles of rubber.

6. A method of modifying a mixture of a latex comprising a copolymer of a major proportion of butadiene and a minor proportion of styrene and a latex comprising a polymer selected from the group consisting of polystyrene and a copolymer of a minor proportion of butadiene and a major proportion of styrene, comprising flowing said latex mixture through a homogenising valve at a pressure not less than about 3000 p.s.i.g., said latex mixture being at a temperature in the range about 50° F. to about 100° F. and having a pH in the range about 8.2 to about 9.5 and a solids content not less than about 25% by weight, whereby in the modified latex mixture substantially all the particles of reinforcing agent are bonded to particles of rubber and the modified latex mixture is made capable of evaporation to a solids content at a given viscosity which solids content is relatively higher than that of the unmodified latex mixture evaporated to the same viscosity.

References Cited

UNITED STATES PATENTS 2,614,093  10/1952  Wheelock _____ 260—892

FOREIGN PATENTS 588,672  12/1959  Canada _____ 260—746

OTHER REFERENCES

Emulsion Technology, 2nd ed. 1946, Chemical Publishing Company, Inc., Brooklyn, N.Y., TP 156 E6E6, pp. 108–109.

MURRAY TILLMAN, Primary Examiner

W. J. BRIGGS, SR., Assistant Examiner

U.S. Cl. X.R.

260—2.5, 41.5, 887, 892, 894